(12) United States Patent
Lenk et al.

(10) Patent No.: US 9,509,026 B2
(45) Date of Patent: Nov. 29, 2016

(54) POWER STATION ARRANGEMENT WITH HIGH-TEMPERATURE STORAGE UNIT

(71) Applicant: Siemens Aktiengesellschaft, Munich (DE)

(72) Inventors: Uwe Lenk, Zwickau (DE); Alexander Tremel, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 94 days.

(21) Appl. No.: 14/420,290

(22) PCT Filed: Jun. 19, 2013

(86) PCT No.: PCT/EP2013/062775
§ 371 (c)(1),
(2) Date: Feb. 6, 2015

(87) PCT Pub. No.: WO2014/026784
PCT Pub. Date: Feb. 20, 2014

(65) Prior Publication Data
US 2015/0207382 A1     Jul. 23, 2015

(30) Foreign Application Priority Data
Aug. 14, 2012 (DE) .......................... 10 2012 214 462

(51) Int. Cl.
*H01M 10/66* (2014.01)
*C25B 15/08* (2006.01)
(Continued)

(52) U.S. Cl.
CPC .............. *H01M 10/66* (2015.04); *C25B 15/08* (2013.01); *F02C 6/14* (2013.01); *F02C 6/18* (2013.01);
(Continued)

(58) Field of Classification Search
CPC ................... F28D 20/8003; F28D 2020/0078; H01M 10/627; H01M 10/66; H01M
(Continued)

(56) References Cited

U.S. PATENT DOCUMENTS 4,003,786 A    1/1977   Cahn
4,330,084 A *   5/1982   Buchner ................... F01K 3/00
                                                           165/104.12
(Continued)

FOREIGN PATENT DOCUMENTS

DE           2640789 A1    3/1977
DE           2807075 A1    8/1979
(Continued)

*Primary Examiner* — Thomas Denion
*Assistant Examiner* — Xiaoting Hu
(74) *Attorney, Agent, or Firm* — Beusse Wolter Sanks & Maire

(57) ABSTRACT

A power station arrangement is provided having an energy generation unit for generating useful thermal energy on the basis of physical and/or chemical processes, a high-temperature storage unit to be at least partially supplied with heat for regular operation, particularly a metal oxide/air storage unit, and a piping system for thermally coupling the energy generation unit to the high temperature storage unit.

15 Claims, 4 Drawing Sheets

(51) Int. Cl.
  *F02C 6/18* (2006.01)
  *H01M 12/08* (2006.01)
  *F02C 6/14* (2006.01)
  *H01M 10/615* (2014.01)
  *H01M 10/627* (2014.01)
  *F01K 23/10* (2006.01)
  *G21D 1/02* (2006.01)
  *F01K 23/14* (2006.01)

(52) U.S. Cl.
  CPC ......... H01M 10/615 (2015.04); H01M 10/627 (2015.04); H01M 12/08 (2013.01); *F01K 23/10* (2013.01); *F01K 23/14* (2013.01); *G21D 1/02* (2013.01); *H01M 2220/10* (2013.01); *H01M 2300/0074* (2013.01); *Y02E 60/36* (2013.01); *Y02P 20/13* (2015.11)

(58) Field of Classification Search
  CPC ....................... 2200/10;H01M 8/04014; H01M 10/615; H01M 10/663; H01M 8/18; H01M 8/186; H01M 2300/0074; H01M 12/08; F01K 23/10; F01K 3/00; F02C 6/14; F02C 6/18; Y02E 60/56; Y02E 60/528; C25B 15/00; C25B 15/02; C25B 15/08
  See application file for complete search history.

(56) References Cited

U.S. PATENT DOCUMENTS

| | | | |
|---|---|---|---|
| 5,541,014 A * | 7/1996 | Micheli | H01M 8/04089 |
| | | | 429/415 |
| 7,491,309 B2 * | 2/2009 | Peter | C25B 1/02 |
| | | | 204/253 |
| 2008/0289955 A1 * | 11/2008 | Balestrino | C25B 1/04 |
| | | | 204/274 |
| 2013/0034784 A1 | 2/2013 | Landes et al. | |
| 2013/0126122 A1 | 5/2013 | Schneider | |
| 2015/0020531 A1 * | 1/2015 | Hanebuth | F02C 6/14 |
| | | | 60/805 |
| 2015/0111160 A1 * | 4/2015 | Brunhuber | H01M 12/08 |
| | | | 431/11 |

FOREIGN PATENT DOCUMENTS

| | | |
|---|---|---|
| DE | 10040655 A1 | 2/2002 |
| DE | 102009057720 A | 6/2011 |
| DE | 102010055997 A | 6/2012 |
| DE | 202011000786 U | 7/2012 |
| DE | 102012203665 A | 9/2013 |
| JP | H03208259 A | 9/1991 |

* cited by examiner

POWER STATION ARRANGEMENT WITH HIGH-TEMPERATURE STORAGE UNIT

CROSS REFERENCE TO RELATED APPLICATIONS

This application is the US National Stage of International Application No. PCT/EP2013/062775 filed Jun. 19, 2013, and claims the benefit thereof. The International Application claims the benefit of German Application No. DE 102012214462.5 filed Aug. 14, 2012. All of the applications are incorporated by reference herein in their entirety.

FIELD OF INVENTION

The present invention relates to a power station arrangement comprising an energy generating unit for generating usable thermal energy and a high-temperature storage unit which is to be supplied with heat, and also to a method for operating such a power station arrangement.

BACKGROUND OF INVENTION

The high-temperature storage units which can be used in conjunction with a power station arrangement, among which are to be counted especially metal oxide storage units (rechargeable metal oxide battery, ROB), including especially metal oxide-air storage units (the metal-air storage units are equivalent), require increased operating temperatures during normal operation and consequently require an at least time-based supply with thermal energy. Above all, in the case of metal oxide-air storage units operating temperatures of over 600° C. are sometimes necessary in order to be able to ensure the necessary ion fluxes in the storage unit in a sufficiently loss-free manner. Since the charging process in the case of such storage units procedes endothermically, moreover, cooling takes place during the charging which can only be reduced or prevented by sufficient heat being fed to the storage unit. Also, during a stationary operation, cooling is carried out mainly by heat losses which need to be compensated. In contrast to this, high-temperature storage units, however, during the discharging process release thermal energy which is generated during exothermic discharging processes and consequently has to be dissipated.

Here, and in which follows, the invention shall relate to high-temperature storage units which are designed for storing and releasing electric power station capacity. Therefore, these are especially electrochemical high-temperature storage units, such as metal oxide storage units.

Further high-temperature storage units are NaNiCl storage units or NaS storage units which have to be operated at temperatures of at least 200° C. Metal oxide storage units, especially metal oxide-air storage units, typically have an operating temperature of up to 900° C. and more so that in the present case the high-temperature storage units are distinguished by an operating temperature of approximately at least 200° C. to about 900° C. The high-temperature storage units according to the invention are distinguished by the fact that they are designed for receiving electric energy (electric current) and for converting it for example by electrochemical reactions into a suitable chemical storage product and for storing it. Such a storage unit is also in a position, however, when necessary, to provide electric energy (electric current) again by means of an electrochemical reverse reaction of this storage product, for example.

Especially the metal oxide-air storage unit developed by the applicant, which is described in more detail for example in DE 10 2009 057 720, requires an at least time-based supply with thermal energy at a temperature level of between 500° C. and 850° C. According to the internally known prior art, this heat can be provided via the air which is fed to the storage unit as process gas. The air is thermally conditioned in this case by means of an electric heating device before it is fed to the storage unit. Alternatively to this, or in addition, heating elements can also be provided inside the metal oxide-air storage unit and can supply the storage unit with thermal energy during operation.

As a further alternative, a high-temperature storage unit can also be operated with increased charging voltage during the charging process, as a result of which the charging current density of the storage unit is increased. As a consequence of increasing this charging current density, the ohmic power loss also increases during the charging process, which can in turn be partially made available to the storage unit as waste heat output.

A disadvantage to the previously described method for heat supply of a high-temperature storage unit is on the one hand that the provision of the thermal output can be achieved only by expenditure of additional energy and therefore by incurring additional costs. On the other hand, the high-temperature storage units are sometimes also to be constructionally adapted so that a suitable heat supply can be enabled in the first place. A heat supply by means of suitable heating elements integrated into the storage unit especially necessitates a high constructional cost.

An external supply of a high-temperature battery with thermal energy is described in the post-published printed document DE 10 2012 203 665 A1. In this, it is instructed to extract thermal energy from the exhaust gas flow of a gas turbine by means of a heat exchanger which is located in this exhaust gas flow. The thermal energy in this case is transferred to a fluid which is fed to the high-temperature battery and can therefore also provide the thermal energy.

An alternative external supply of a solid oxide fuel cell, which can also be operated in the reverse direction for storing hydrogen as fuel, is described in the prior-publicized printed document JP03208259A. In this case, it is instructed that steam from a nuclear power-station steam generator after additional superheating can be fed to the fuel cell for the transfer of heat.

A disadvantage of these solutions known from the prior art, however, is that the thermal energy which is fed to the high-temperature battery or to the solid oxide fuel cell sometimes does not allow sufficiently advantageous energetic utilization of the primary heat source. Whereas in DE102012203665 A1 it is instructed to extract the thermal energy directly from the exhaust gas flow of a gas turbine and to therefore disadvantageously cool this for further applications, JP03208259A instructs a direct fluidic connection to a water-steam cycle of a nuclear power station.

When supplying a high-temperature storage unit by means of an increased waste heat output in the case of increased charging current density, however, a chemical or even physical degradation of the storage unit is sometimes to be feared. Moreover, during the charging process under increased charging output the charging current density is typically significantly higher in comparison to the discharging current density, which in turn requires a suitable adaptation and dimensioning of the associated electrical infrastructure

SUMMARY OF INVENTION

The present invention is consequently based on an object of proposing a suitable high-temperature storage unit for use in conjunction with a power station, which avoids the aforementioned disadvantages during operation. In particular, a power station arrangement with a high-temperature storage unit, which enables an energy-efficient operation, is to be proposed. The high-temperature storage unit is in this case to be designed for storing and releasing electric power station capacity which can be used as regulating capacity in the event of fluctuation of the electric current availability in the public electricity supply networks.

According to the invention, these objects are achieved by means of a power station arrangement and also by means of a method for operating such a power station arrangement according to the claims.

The objects upon which the invention is based are especially achieved by means of a power station arrangement comprising an energy generating unit, provided for electric power generation, which also provides usable thermal energy on the basis of physical and/or chemical processes, an electrochemical high-temperature storage unit, especially a metal oxide-air storage unit, which is to be supplied at least partially with heat for normal operation, and a piping system for thermally coupling the energy generating unit to the high-temperature storage unit, wherein the piping system includes a first heat exchanger which is designed for utilizing a steam flow supplied with heat by the energy generating unit and tapped from a steam pipe for the transfer of heat to an air flow, which air flow is fed via the piping system to the high-temperature storage unit.

The objects upon which the invention is based are furthermore achieved by means of a method for operating a power station arrangement comprising an energy generating unit, provided for electric power generation, which also provides usable thermal energy on the basis of physical and/or chemical processes, an electrochemical high-temperature storage unit, especially a metal oxide-air storage unit, which is to be supplied at least partially with heat for normal operation, and also a piping system for thermally coupling the energy generating unit to the high-temperature storage unit, comprising the following steps:—operating the energy generating unit for generating usable thermal energy;—transferring at least some of this thermal energy to an air flow by means of a first heat exchanger which is designed for utilizing a steam flow supplied with heat by the energy generating unit and tapped from a steam pipe for the transfer of heat to an air flow, which air flow is fed via the piping system to the high-temperature storage unit;—supplying the high-temperature storage unit with the air flow.

The objects upon which the invention is based are consequently achieved by means of a suitable power station arrangement which in addition to an energy generating unit for generating usable thermal energy also comprises an electrochemical high-temperature storage unit which is advantageously thermally coupled via a piping system to the energy generating unit. As a result of the thermal coupling, thermal heat can be extracted from the energy generating unit and also be made available as heat to the high-temperature storage unit.

The energy generating unit according to the invention is in this case to be understood in the sense of a part of a power station arrangement which primarily enables an electric power generation. The energy which is provided by the energy generating unit is primarily electric energy. Usable thermal energy also accumulates only as a secondary product, for example, which can be made available to the high-temperature storage unit. Typical energy generating units are gas turbine plants or steam turbine plants which are equipped with generators. In this case, it is apparent to the person skilled in the art that the energy generating unit in the physical sense does not generate energy out of nothing but it only converts one form of energy into another form. The energy generating unit shall therefore relate to a provision of electric energy, wherein thermal energy accumulates as a secondary product.

It may also be noted that the energy generating unit of the power station arrangement can typically provide thermal energy on the basis of combustion processes or exothermic chemical reactions. On the other hand, however, purely physical processes, such as nuclear fission processes, are also conceivable for providing thermal energy. The energy generating unit can consequently also be designed as a nuclear reactor.

According to the invention, the extraction of waste heat, that is to say thermal energy of the energy generating unit which is not used for a power generation process, for example, therefore enables the high-temperature storage unit to be supplied with heat via the piping system. A supply of the high-temperature storage unit for example via electrically operated heating elements is therefore no longer necessary, or no longer exclusively necessary, but the heat supply can be achieved by means of a direct extraction of heat energy from the energy generating unit. By the extraction of waste heat from the energy generating unit the overall efficiency of the power station arrangement can be advantageously improved.

Reference may furthermore be made to the fact that the piping system according to the invention for the thermal coupling is typically designed as a fluid piping system. Other types of piping system, which are also suitable for the thermal coupling, that is to say for thermal conduction, are in principle to be embraced by the inventive idea as well, however. The piping system is therefore to be understood in a general way.

According to the invention, it is furthermore provided that the piping system includes a first heat exchanger which is designed for utilizing a steam flow supplied by the energy generating unit and tapped from a steam pipe for the transfer of heat to an air flow, which air flow is fed via the piping system to the high-temperature storage unit. The steam flow according to the embodiment in this case serves especially for energy generation or energy utilization in a steam process. Consequently, the thermal energy provided by the energy generating unit primarily serves for steam preparation, wherein only some of this steam energy is provided for supplying the high-temperature storage unit with heat. This ensures an energetically efficient utilization of the thermal energy.

According to the invention, the heat demand of the high-temperature storage unit during the charging process, but also during a stationary operation, can be covered by thermal energy of the energy generating unit. According to the invention, the heat demand can generally be covered during a normal operation. A normal operation of the high-temperature storage unit in this case comprises all operating modes which may be necessary for the use of a high-temperature storage unit. Especially to be counted among these are: starting operation, load operation during a charging process or a discharging process, partial load operation during a charging process or a discharging process, stationary operation, heat retention operation, etc. In addition to the already mentioned efficiency improvement during operation of the power station arrangement, at the same time self-discharging losses of the high-temperature storage unit, which would result on account of fluctuations of the operating temperature, can therefore also be reduced. Moreover, the high-temperature storage unit is sometimes ready for operation more quickly as a result of the heat supply according to the invention and therefore increases the flexibility of the power generation of the power station arrangement.

For the implementation of a thermal coupling of high-temperature storage unit and energy generating unit, use can furthermore be made of already existing power station components which only have to be complemented by the high-temperature storage unit and the piping system. Thus, for example already existing power stations for power generation can be suitably retrofitted with a high-temperature storage unit together with a piping system in order to improve these with regard to their load flexibility.

According to a first embodiment of the invention, it is provided that the piping system has at least one first section which is designed for supplying the high-temperature storage unit with thermally conditioned air. This embodiment is especially suitable in the case of metal oxide-air storage units which require air as process gas. Therefore, for example during the charging process oxygen can be released from a metal oxide, absorbing electrical capacity, which oxygen for example can be added to the air which supplies the high-temperature storage unit with thermal heat. In contrast to this, during a discharging process oxygen can be extracted from the air which supplies the high-temperature storage unit with thermal heat in order to oxidize the metal existing as storage species, releasing electrical capacity. A mixture consisting of nitrogen and oxygen, which can contain additional gases in smaller proportions, is to be understood as air in the sense of the invention. The nitrogen proportion in this case comprises for example 78 vol. %, wherein the oxygen proportion comprises for example 21 vol. %. Deviations from these proportions by up to for example 20% are to be covered by the present invention as well.

If the air which is fed to the high-temperature storage unit has sufficient thermal energy, especially during the charging process, then this can be at least partially transferred to the high-temperature storage unit by direct exchange of heat.

Since, moreover, air constitutes a gas mixture which is easy to manage and is inexpensive, an advantageous heat supply of the metal storage unit is possible according to the embodiment.

According to a further embodiment of the invention, it is provided that the energy generating unit is designed as a gas turbine and/or as a solid material combustion chamber and/or as an entrained gasifier and/or as a fluidized bed gasifier and/or as a nuclear high-temperature reactor. The energy generating unit is consequently based on conventional power station technology in which in addition to the heat used for the power generation process waste heat is also released and serves for the advantageous heat supply of the high-temperature storage unit.

The thermal energy, for supplying the high-temperature storage unit, can be extracted directly from the core of the energy generating unit, for example from the combustion chamber of a gas turbine, which is provided for the power generation, or can also be extracted from additional devices which interact in unity with the energy generating unit for the transferring of thermal energy. Thus, in the case of an entrained gasifier, for example, the thermal energy for supplying the high-temperature storage unit is not extracted directly from the entrained gasifier itself but from a heat recovery heat steam generator which interacts therewith.

According to a further embodiment of the invention, it is provided that the piping system includes a second heat exchanger which is designed for transferring heat generated in the energy generating unit to an air flow which is fed to the high-temperature storage unit. The heat extracted from the energy generating unit can be extracted at various points. The second heat exchanger in this case allows an advantageous heat coupling between the energy generating unit and the air flow which supplies the high-temperature storage unit without the direct feed of process air which is possibly laden with impurities.

Should the thermal output which is transferred to the air flow by means of the second heat exchanger not be sufficient, it can also be provided that the second heat exchanger additionally has an electric heating device. Consequently, the air flow can still be supplied with additional heat when necessary.

According to a development, it can also be provided that the second heat exchanger is designed for being supplied via the piping system with an exhaust gas flow from an expansion stage of a gas turbine and/or with an exhaust gas flow extracted from a combustion chamber of a gas turbine and/or with an air flow extracted from a compression stage of a gas turbine for the transfer of heat. According to the embodiment, thermally conditioned fluid, which is suitable for the transfer of second in the first heat exchanger, can be extracted from a gas turbine at different points.

According to an alternative embodiment, the heat fluxes discharged from the gas turbine can also be fed to the high-temperature storage unit directly, i.e. not indirectly via the second heat exchanger. Since, however, contamination can frequently be associated with a direct input of these fluid flows into the high-temperature storage unit, a contamination and therefore in the long term also destruction of the high-temperature storage unit cannot be excluded.

According to a further advantageous embodiment of the invention, it can be provided that the piping system includes a third heat exchanger which is designed for utilizing a heat flux discharged from the high-temperature storage unit for the transfer of heat to an air flow which is fed to the high-temperature storage unit.

The heat flux discharging from the high-temperature storage unit is consequently directed again a cyclic circuit to a place upstream with regard to the high-temperature storage unit in order to thermally condition there the air flow which is fed to the high-temperature storage unit. A heat loss from the high-temperature storage unit can therefore be reduced, especially during an exothermic discharging process of the high-temperature storage unit.

According to a further embodiment, it is also conceivable to make the heat flux discharging from the high-temperature storage unit available to a steam process which for example is provided for the reconversion of thermal energy. Thus, for example the heat flux can also be fed to a heat recovery steam generator which is incorporated in a steam turbine plant.

Also, the heat flux discharging from the high-temperature storage unit can be fed to a heat accumulator for use at a later time. Thermal energy which is demanded during a charging process, for example, can be extracted from such an accumulator.

In an advantageous continuation, it is provided that the third heat exchanger is additionally thermally coupled to the second heat exchanger. Accordingly, an especially efficient utilization of heat is carried out.

According to another embodiment of the invention, it is provided that the piping system comprises an inlet point arranged on the upstream side with regard to the high-temperature storage unit, which is designed for feeding back an air flow discharged from the high-temperature storage unit into the piping system in order to mix this with the air flow which is fed to the high-temperature storage unit. The air discharging from the high-temperature storage unit and having thermal energy is consequently fed back to an inlet point of the piping system which is arranged on the upstream side with regard to the high-temperature storage unit. As a result of the mixing process between new air, i.e. air not yet fed to the high-temperature storage unit, and used air, i.e. air already fed to the high-temperature storage unit, an especially efficient transfer of heat is carried out. This reduces the thermal loss capacity of the high-temperature storage unit significantly.

According to a continuing embodiment, the steam pipe can be a high-pressure steam pipe in which a pressure of up to 300 bar prevails during normal operation. Such high-pressure steam pipes are provided for example in a coupled gas and steam power station in which for steam-side power generation they supply a high-pressure steam turbine with heat. The temperature level of the steam which prevails in the steam pipe reaches up to 600° C. and is therefore especially suitable for supplying a high-temperature storage unit, particularly a metal oxide-air storage unit, the operating temperatures of which lie at similar temperature levels.

According to a further embodiment, it can also be provided that the steam pipe is thermally and/or fluidically coupled to a heat recovery steam generator of a steam power station. The steam pipe is incorporated in a steam turbine plant for electric power generation. Alternatively, the heat which is fed to the high-temperature storage unit can also be extracted directly from the heat recovery steam generator or from vessels incorporated in this.

Such a steam turbine plant is especially incorporated in a combined gas and steam power station.

According to a further aspect, according to the embodiment the piping system of the power station arrangement can have at least one second section which is designed for supplying the high-temperature storage unit with thermally conditioned water and/or steam. The metal oxide-air storage unit developed by the applicant, which is also described in DE 10 2009 057 720, especially requires a supply with steam. The steam in this case especially serves as chemical transport species which transports oxygen between a storage species (metal and metal oxide) and an electrode surface. Thus, during the discharging process, for example, the water in gaseous phase transports oxygen atoms from the anode surface to the storage-species metal and oxidizes this. During the charging process, however, the gaseous water transports oxygen from the oxidized metal back again to the electrode. During a normal operation, such a metal oxide-air storage unit typically requires a continuous supply with steam or with hydrogen in order to also compensate for leakage losses. This requirement can be covered at the same time by the provision of thermal energy by means of the water or the steam.

According to a continuation of this embodiment, it is provided that the second section of the piping system is a low-pressure steam pipe in which a pressure of 10 bar at most prevails during normal operation. At the same time, such low-pressure steam pipes have steam of a temperature of not more than 170° C. Consequently, a supply of the high-temperature storage unit by means of water and/or steam from this low-pressure steam pipe is mainly suitable during the starting operation of the high-temperature storage unit if the operating temperature of the high-temperature storage unit is still comparatively low. If higher steam temperatures are required, a thermal conditioning (electric heater, exchange of heat with a hot fluid, etc.) of the steam can be provided before entry into the storage unit.

According to an additionally suitable embodiment, it is provided that the second section is thermally and fluidically coupled to a heat recovery steam generator of a steam turbine plant. The extraction of heat or fluid can consequently be carried out from a heat recovery steam generator which is advantageously used in conjunction with a steam turbine plant for power generation.

BRIEF DESCRIPTION OF THE DRAWINGS

The invention shall be explained in detail below with reference to individual figures. In this case, reference is to be made to the fact that the figures are to be understood as being schematic views of connections which do not allow any limitation with regard to a concrete implementability. Reference is also to be made to the fact that the features which are covered by the embodiments depicted in the figures are claimed on their own but also collectively with other features.

In the drawings in this case.

DETAILED DESCRIPTION OF INVENTION

Figure 1:
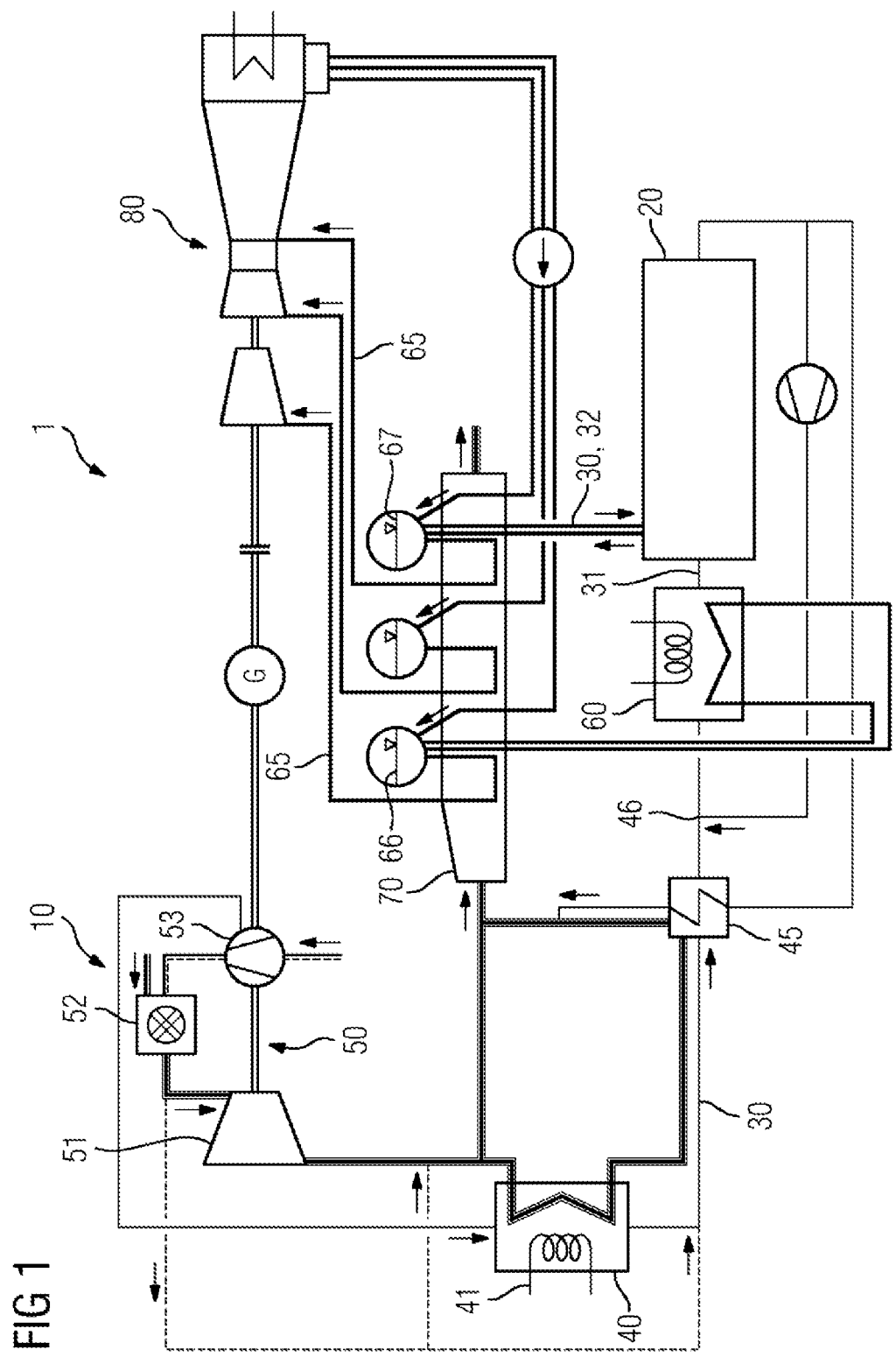
FIG. 1 shows a schematic view of connections of a first embodiment of the invention.

FIG. 1 shows a schematic view of a first embodiment of the power station arrangement 1 according to the invention. In this case, a gas turbine 50 is incorporated as an energy generating unit 10 and has an expansion stage 51, a combustion chamber 52 connected thereto, and a compression stage 53 connected thereto. Thermally conditioned fluid flows can be extracted both from the expansion stage 51 and from the combustion chamber 52 and from the compression stage 53 in each case and are fed to a second heat exchanger 40. The composition of the respectively extracted fluid flows can vary. Thus, for example the fluid flow extracted from the compression stage 53 is a thermally conditioned air flow. The fluid flow extracted from the combustion chamber 52, like the fluid flow as an exhaust gas flow extracted from the expansion stage 51, can also have combustion products. The gas turbine 50 is coupled to a generator (identified by the letter G) for torque transmission and allows power generation by means of the generator G during operation.

The second heat exchanger 40 has an electric heating device 41 which in addition to the transfer of heat by means of the flows diverted from the gas turbine 50 provides an additional source of heat. The second heat exchanger 40 allows the thermal conditioning of an air flow which is contained in the piping system 30 and fed to the high-temperature storage unit 20. The high-temperature storage unit 20 is optionally designed as a metal oxide storage unit or as a metal oxide-air storage unit. In the present case the air flow is extracted from the compression stage 53, but can also be extracted from the open environment or from other air sources. According to an alternative embodiment, thermal conditioning of the air flow by means of the second heat exchanger 40 can also be dispensed with.

The second heat exchanger 40 is included in the piping system 30 which, moreover, has an additional third heat exchanger 45. The third heat exchanger 45 in turn allows thermal conditioning of the air flow which is fed to the high-temperature storage unit 20, wherein a transfer of heat is carried out between a heat flux which is discharged from the high-temperature storage unit 20 and fed back into the piping system 30. The transfer of heat by means of the third heat exchanger 45 is carried out on the upstream side with regard to the arrangement of the high-temperature storage unit 20 in the piping system 30. Especially during operation of the high-temperature storage unit 20 during a discharging process, heat can be discharged on account of the exothermic reactions taking place in the high-temperature storage unit 20 and is transferred again to the air flow which is fed to the high-temperature storage unit 20. It is also conceivable according to the embodiment to make this heat flux discharged from the high-temperature storage unit 20 available to a heat recovery steam generator 70 of a steam turbine plant 80. Alternatively or additionally, the heat flux discharged from the high-temperature storage unit 20 in the form of a fluid flow can be fed at an inlet point 46, which is upstream with regard to the high-temperature storage unit 20, to the piping system 30 and is mixed with the air flow present therein. This allows on the one hand a feedback of heat and on the hand also an adjustment of the composition of the gas mixture which is conducted in the piping system 30. Such mixing is expedient in so far that the air flow which is diverted from the high-temperature storage unit 20 can have a different chemical composition in comparison to the air flow which is fed to this storage unit 20.

In addition, it is provided according to the embodiment to thermally condition the air flow conducted in the piping system 30 by means of a first heat exchanger 60 which is thermally coupled to a steam pipe 65 of a high-pressure rail 66 of a steam turbine plant 80. Moreover, the first heat exchanger 60 has a heating device as an external source of heat.

The air flow which is conducted from the piping system 30 to the high-temperature storage unit 20 is conducted through a first section 31 of the piping system 30 which is designed for supplying the high-temperature storage unit 20 with thermally conditioned air. In addition, the piping system 30 has a second section 32 which is designed for supplying the high-temperature storage unit 20 with thermally conditioned water and/or steam (subsequently summarized under the term water). The water in this case is conducted by suitable steam pipes 65 which enable a directed supply of individual steam turbines (HP, IP, LP) for power generation by means of a steam process. For steam preparation, provision is made for a heat recovery steam generator 70 which according to the embodiment is supplied with heat by means of exhaust gas of the expansion stage 51 of the gas turbine 50.

As explained above, heat for the conditioning of the air flow fed to the high-temperature storage unit 20 by means of the first heat exchanger 60 can be extracted from the heat recovery steam generator 70. In addition, however, a direct supply of the high-temperature storage unit 20 with water is also conceivable and in the present case is carried out via the second section of the piping system 30. To this end, the second section 32 is fluidically coupled to the low-pressure rail 67 of the steam pipes 65 of the turbine plant 80. Depending on demand, thermally conditioned water for supplying the high-temperature storage unit 20 can be extracted from this low-pressure rail 67.

Figure 2:
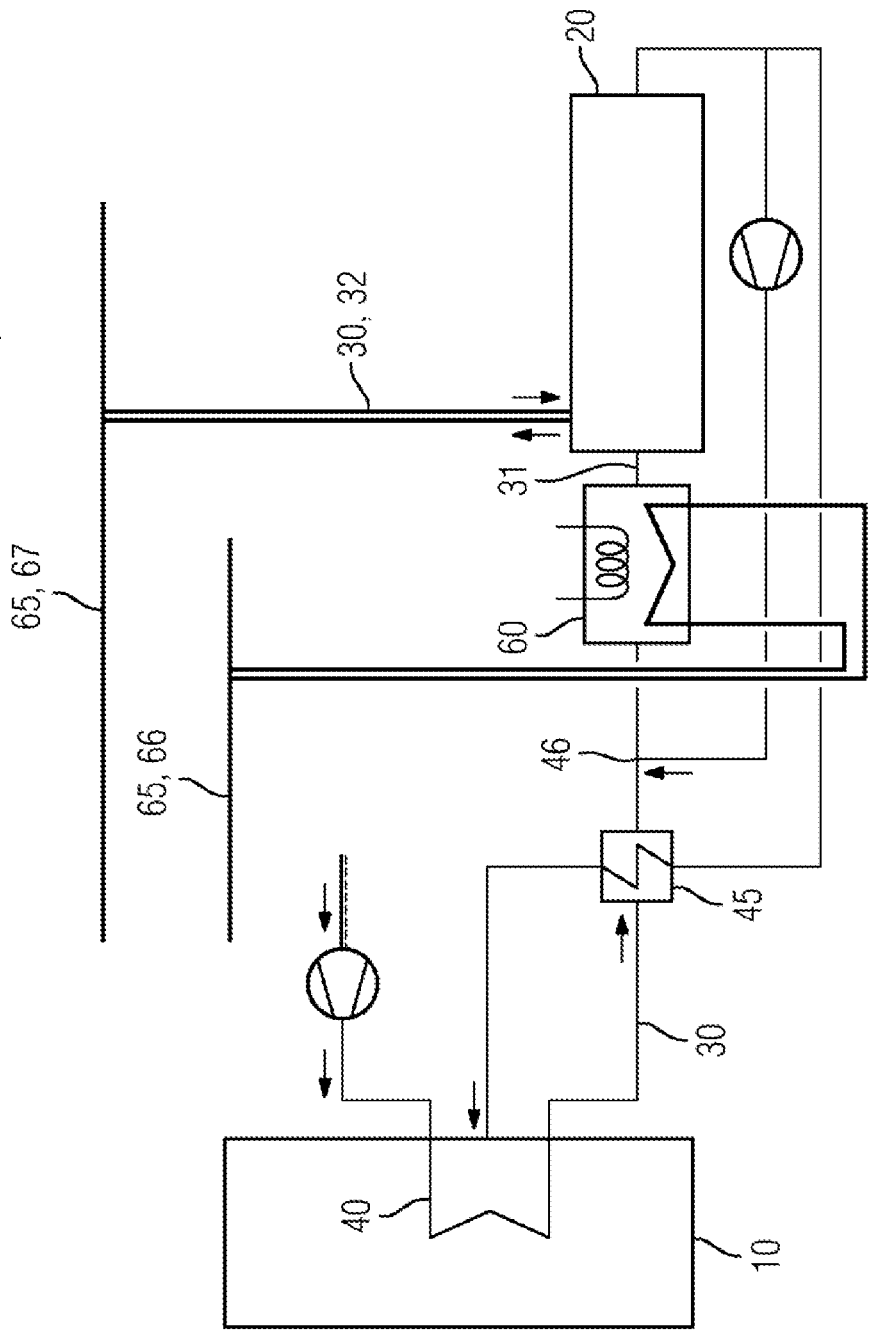
FIG. 2 shows a further embodiment of the invention in a schematic view of connections.

FIG. 2 shows a schematic view of connections of a further embodiment of the power station arrangement 1 according to the invention. In this case, the power station arrangement 1 differs from the power station arrangement 1 shown in FIG. 1 essentially owing to the fact that the gas turbine 50 as an energy generating unit 10 is replaced by an additional energy generating unit 10. This energy generating unit 10 can especially be designed as a solid material combustion chamber, as a fluidized bed gasifier or as a nuclear high-temperature reactor. Since the heat transfer principles are in the main comparable in all the embodiments, no diagrammatic differentiations have been made. Rather, it is vital that a transfer of heat via the second heat exchanger 40, which is in thermal functional communication with the energy generating unit 10, is achieved.

Reference is furthermore to be made to the fact that the embodiments incorporated in FIG. 2 can also include steam pipes 65 which allow a suitable heat supply or water supply to the high-temperature storage unit 20. In the present case, a high-pressure rail 66 and also a low-pressure rail 67 have been shown, but additional steam pipes 65 at different pressure levels are also conceivable. A heat supply as well as a water supply to the high-temperature storage unit 20 can be carried out via the water from these steam pipes 65.

Figure 3:
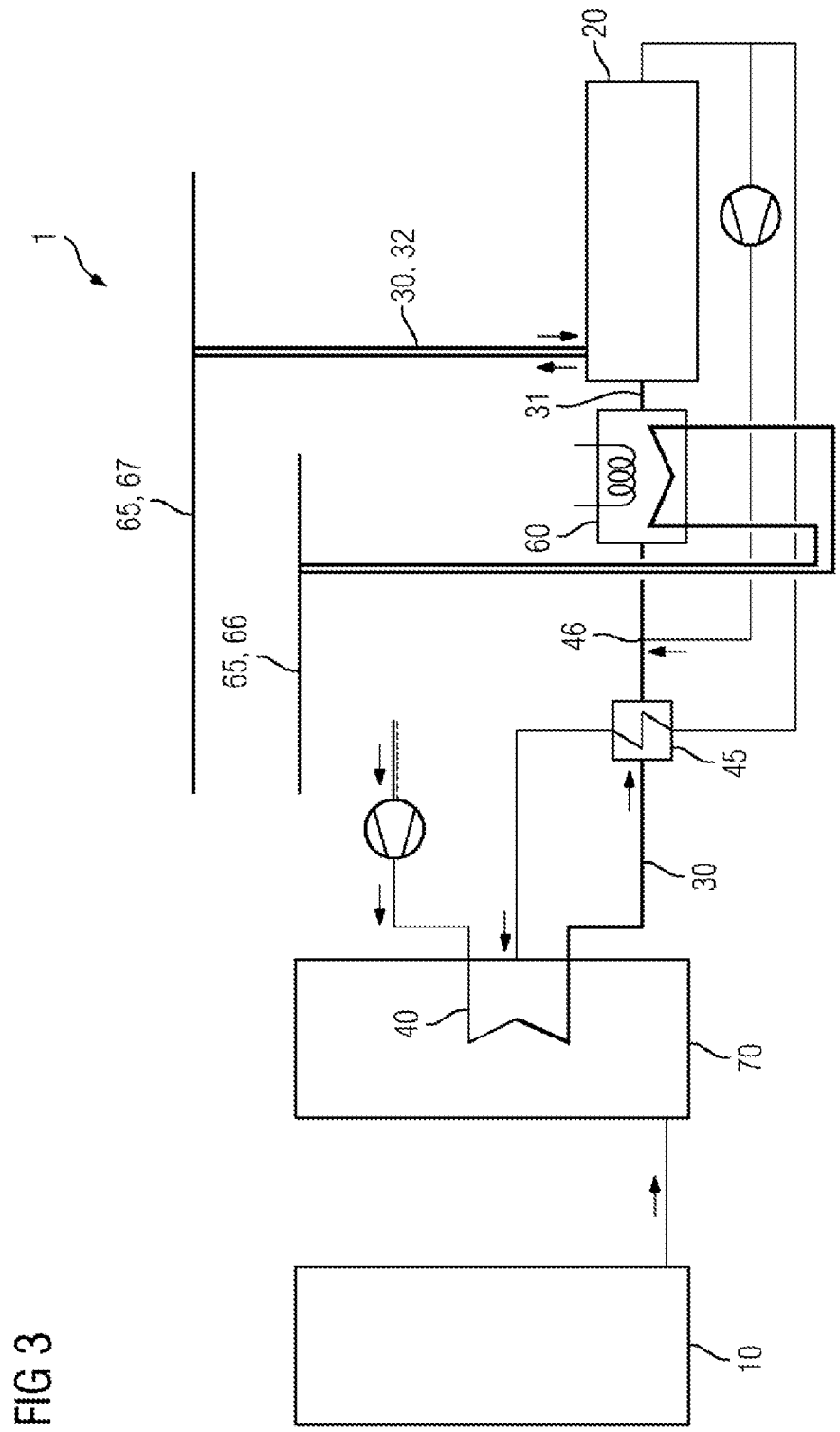
FIG. 3 shows a further embodiment of the invention in a schematic view of connections.

FIG. 3 shows a further embodiment of the power station arrangement 1 according to the invention, which differs from the embodiments shown in FIG. 2 only to the effect that the energy generating unit 10 is designed as an entrained gasifier. Since an integration of the second heat exchanger 40 into the entrained gasifier itself is not technically practical, the transfer of heat between the energy generating unit 10 and the second heat exchanger 40 initially requires a transfer of heat from the entrained gasifier to a heat recovery steam generator 70. The second heat exchanger 40 is located in this heat recovery steam generator 70 or is in thermal functional communication with this.

Figure 4:
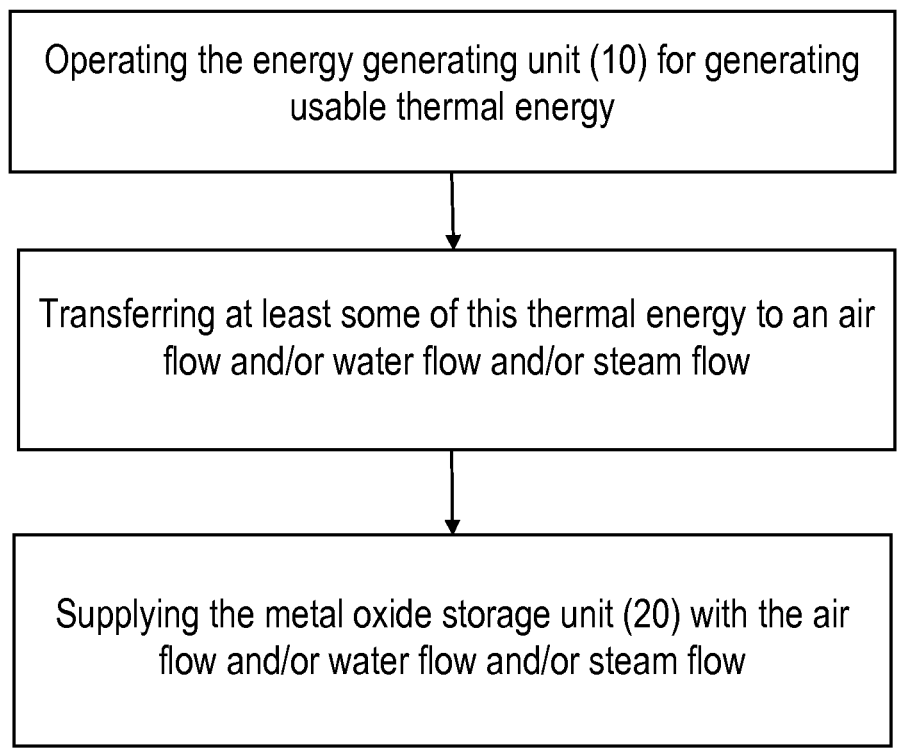
FIG. 4 shows a flow diagram for illustrating the method according to the invention for operating an embodiment of the power station arrangement according to the invention.

FIG. 4 shows an embodiment of the method according to the invention with reference to a flow diagram. According to the embodiment, in this case in a first step the energy generating unit 10 is operated for generating usable thermal energy. In a further step, at least some of this thermal energy is subsequently transferred to an air flow by means of a first heat exchanger 60 which is designed for utilizing a steam flow supplied with heat by the energy generating unit 10 and tapped from a steam pipe 65 for the transfer of heat to the air flow, which air flow is fed via the piping system 30 to the high-temperature storage unit 20. In a third subsequent step, the high-temperature storage unit 20 can now be supplied with the thermally conditioned air flow so that a transfer of heat is carried out.

Further embodiments are gathered from the dependent claims.

The invention claimed is:

1. A power station arrangement comprising
an energy generating unit, provided for electric power generation, and which also provides usable thermal energy on the basis of physical and/or chemical processes,
an electrochemical high-temperature storage unit which is to be supplied at least partially with heat for normal operation, and
a piping system for thermally coupling the energy generating unit to the high-temperature storage unit,
wherein the piping system includes a first heat exchanger adapted for utilizing a steam flow supplied with heat by the energy generating unit and tapped from a steam pipe for the transfer of heat to an air flow, which air flow is fed via the piping system to the high-temperature storage unit.

2. The power station arrangement as claimed in claim 1, wherein the piping system has at least one first section adapted for supplying the high-temperature storage unit with thermally conditioned air.

3. The power station arrangement as claimed in claim 1, wherein the energy generating unit comprises a gas turbine and/or a solid material combustion chamber and/or an entrained gasifier and/or a fluidized bed gasifier and/or a nuclear high-temperature reactor.

4. The power station arrangement as claimed in claim 1, wherein the piping system includes a second heat exchanger adapted for transferring heat generated in the energy generating unit to the air flow which is fed to the high-temperature storage unit.

5. The power station arrangement as claimed in claim 4, wherein the second heat exchanger further comprises an electric heating device.

6. The power station arrangement as claimed in claim 4, wherein the second heat exchanger is adapted for being supplied via the piping system with an exhaust gas flow from an expansion stage of a gas turbine and/or with an exhaust gas flow extracted from a combustion chamber of the gas turbine and/or with an air flow extracted from a compression stage of the gas turbine for the transfer of heat.

7. The power station arrangement as claimed in claim 4, wherein the piping system includes a third heat exchanger adapted for utilizing a heat flux discharged from the high-temperature storage unit for the transfer of heat to the air flow which is fed to the high-temperature storage unit.

8. The power station arrangement as claimed in claim 7, wherein the third heat exchanger is additionally thermally coupled to the second heat exchanger.

9. The power station arrangement as claimed in claim 1, wherein the steam pipe is a high-pressure steam pipe in which at least a pressure of 90 bar prevails during normal operation.

10. The power station arrangement as claimed in claim 1, wherein the steam pipe is thermally and/or fluidically coupled to a heat recovery steam generator of a steam turbine plant.

11. The power station arrangement as claimed in claim 1, wherein the piping system has at least one second section which is designed for supplying the high-temperature storage unit with thermally conditioned water and/or steam.

12. The power station arrangement as claimed in claim 11, wherein the second section is a low-pressure steam pipe in which a pressure of 10 bar at most prevails during normal operation.

13. The power station arrangement as claimed in claim 11, wherein the second section is thermally and/or fluidically coupled to a heat recovery steam generator of a steam turbine plant.

14. A method for operating a power station arrangement having an energy generating unit, provided for electric power generation, and which also provides usable thermal energy on the basis of physical and/or chemical processes, an electrochemical high-temperature storage unit, which is to be at least partially supplied with heat for normal operation, and a piping system for thermally coupling the energy generating unit to the high-temperature storage unit, the method comprising:
operating the energy generating unit for generating usable thermal energy;
transferring at least some of this thermal energy to an air flow by a first heat exchanger adapted for utilizing a steam flow supplied with heat by the energy generating unit and tapped from a steam pipe for the transfer of heat to the air flow, which air flow is fed via the piping system to the high-temperature storage unit; and
supplying the high-temperature storage unit with the air flow.

15. The method of claim 14, wherein the electrochemical high-temperature storage unit comprises a metal oxide-air storage unit.

* * * * *